United States Patent [19]

Sabot et al.

[11] Patent Number: 4,647,438

[45] Date of Patent: Mar. 3, 1987

[54] SEPARATION OF RARE EARTH VALUES BY LIQUID/LIQUID EXTRACTION

[75] Inventors: Jean-Louis Sabot, Maisons Laffitte; Alain Rollat, Paris, both of France

[73] Assignee: Rhone-Poulenc Specialties Chimiques, Courbevoie, France

[21] Appl. No.: 719,139

[22] Filed: Apr. 2, 1985

[30] Foreign Application Priority Data

Apr. 2, 1984 [FR] France ............................ 84 05139

[51] Int. Cl.$^4$ ............................................. C01F 17/00
[52] U.S. Cl. ........................... 423/21.5; 423/DIG. 14; 75/101 BE
[58] Field of Search ...................... 423/21.5, DIG. 14; 75/101 BE

[56] References Cited

U.S. PATENT DOCUMENTS

| | | | |
|---|---|---|---|
| 3,966,569 | 6/1976 | Reinhardt et al. | 75/101 BE |
| 4,041,125 | 8/1977 | Alstad et al. | 423/21.5 |
| 4,382,016 | 5/1983 | Rickelton et al. | 252/428 |
| 4,461,748 | 7/1984 | Sabot et al. | 423/21.5 |

FOREIGN PATENT DOCUMENTS

| | | | |
|---|---|---|---|
| EPA26132 | 4/1981 | European Pat. Off. | |
| 1566623 | 3/1969 | France | |
| 2267380 | 7/1975 | France | |
| 142311 | 12/1978 | Japan | 423/21.5 |
| 142310 | 12/1978 | Japan | 423/21.5 |
| 54-03672 | 7/1979 | Japan | |
| 952742 | 8/1982 | U.S.S.R. | 423/21.5 |

OTHER PUBLICATIONS

Brown et al, "Proceedings of the 7th Rare Earth Research Conference", vol. 1, Oct. 1968, Coronado, Calif.
Chemical Abstracts, vol. 82, 1975, No. 116863f.
Chemical Abstracts, vol. 81, 1974, No. 180681b.

Primary Examiner—H. T. Carter
Attorney, Agent, or Firm—Burns, Doane, Swecker & Mathis

[57] ABSTRACT

At least one rare earth value is selectively separated from at least one other rare earth value, by selectively liquid/liquid extracting an aqueous phase comprising the nitrates of said rare earth values with an organic phase which comprises an organic extractant, said organic extractant comprising at least one organophosphinic compound having one of the formulae (I) or (I'):

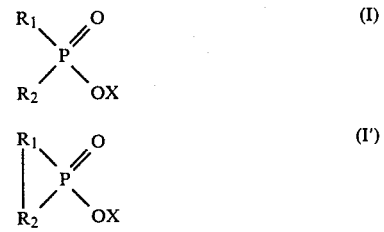

wherein $R_1$ and $R_2$, which may be identical or different, are each substituted or unsubstituted alkyl, cycloalkyl, alkoxyalkyl or alkylcycloalkyl radicals, and X is either hydrogen or a cation.

25 Claims, 3 Drawing Figures

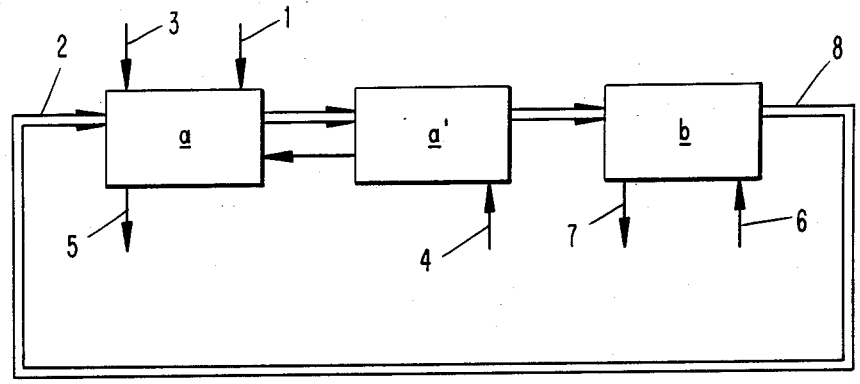
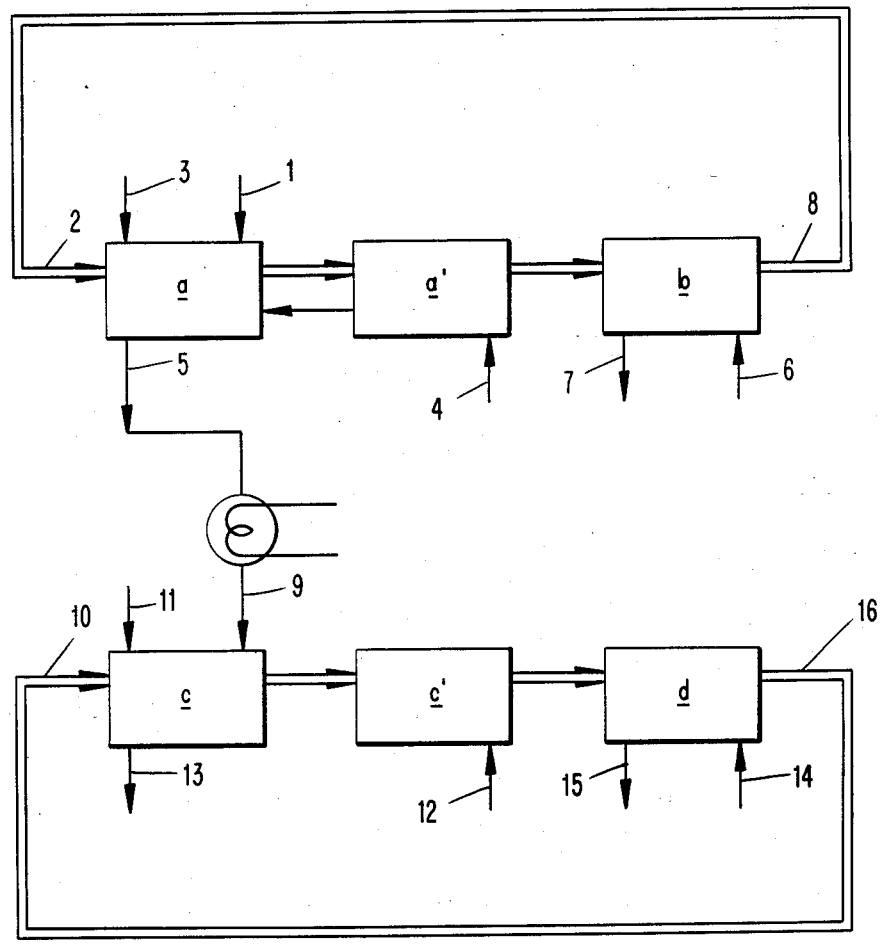

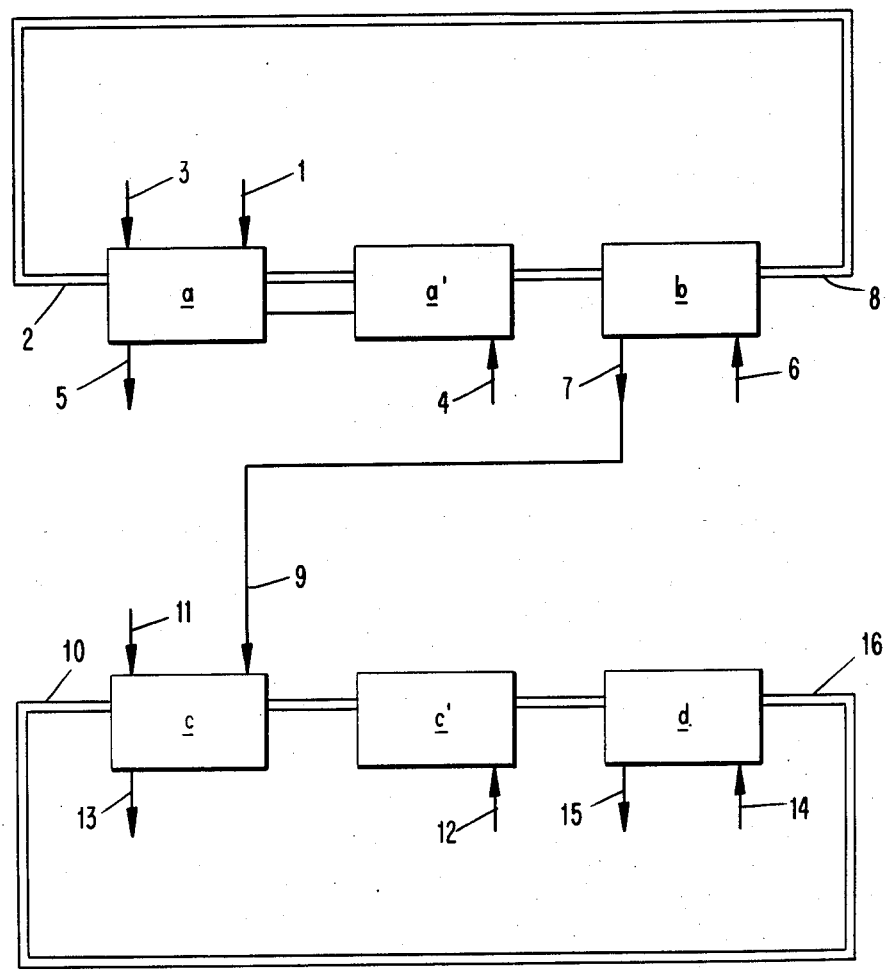

SEPARATION OF RARE EARTH VALUES BY LIQUID/LIQUID EXTRACTION

BACKGROUND OF THE INVENTION

1. Field of the Invention

The present invention relates to the solvent separation or rare earth values from aqueous solutions thereof, and, more especially, to the liquid/liquid selective extraction of rare earth values from aqueous solutions of the nitrates of such values.

By the expression "rare earths" as utilized herein, there are intended the lanthanide rare earth elements having atomic numbers of from 57 to 71, inclusive, as well as yttrium which has an atomic number of 39.

Also as utilized herein, by the expression "ceric rare earths" are intended the lightest of the rare earth elements, beginning with lanthanum and extending to neodymium according to atomic number, and by "yttric rare earths" are intended the heavier rare earth elements based on atomic number, beginning with samarium and terminating with lutecium and including yttrium.

2. Description of the Prior Art

It is well known to this art that the rare earths are very difficult to separate from each other because of the similarity in their properties.

In order to separate these elements individually, which are very closely related, methods have to date been developed which have become particularly valuable in the separation of the rare earths, namely, various liquid/liquid extraction techniques. Such techniques are based upon the selective extraction of one of the rare earths from solution thereof by means of an extraction solvent, or extractant, which is immiscible with the solution.

Certain organophosphoric acids, for example, have heretofore been used as extractants for the separation of the rare earths by reason of their marked selectivity, both with respect to the ceric rare earths, as well as with respect to the yttric rare earths.

Thus, diesters of phosphoric acid, in particular di-(2-ethylhexyl)phosphoric acid or H.D.E.H.P. (see published French Patent Application No. 2,233,284) are currently used as extraction solvents. However, militating against their good selectivity is the fact that extraction with such extractants requires large amounts of reagents upon the separation of the yttric rare earths, due to the difficult re- or back-extraction at the point in time of regeneration of the solvent. And energy costs are at times increased due to the necessity of concentrating the solutions which are obtained in dilute form upon re-extraction for the same reason.

The art was advanced by using esters of alkylphosphonic acids, in particular the 2-monoethylhexyl ester of 2-ethylhexylphosphonic acid or H.E.P. (E.H.P.) (see published French Patent Application No. 2,460,275), which esters permit more economical separations due to a low extraction constant with, hence, an easier re-extraction. Nevertheless, the aforementioned drawbacks are again present, although to a lesser extent, in the case of the separation of the yttric rare earths, which are the heaviest.

Another technique for reducing the value of the extraction constant consists of replacing the diluents customarily used, i.e., aliphatic hydrocarbons such as kerosene or dodecane, by aromatic hydrocarbons such as, for example, xylene or Solvesso. Such technique, however, has its drawbacks since these latter diluents are less resistant to degradation by the various chemical agents to which they are exposed.

SUMMARY OF THE INVENTION

Accordingly, a major object of the present invention is the provision of an improved process for the liquid/liquid selective extraction of rare earth values from aqueous solutions thereof, which improved process is characterized by the use of a novel class of organic extractants providing lower extraction constants and which improved process otherwise avoids those disadvantages and drawbacks to date plaguing the state of this art, while at the same time preserving the excellent selectivity attained when using the aforesaid two classes of prior art extractants.

Briefly, the present invention features a method for separating rare earth values contained in an aqueous solution comprising at least two rare earth elements, by liquid/liquid extraction of an aqueous phase containing the salts of such metals with an organic phase, and wherein an aqueous solution of the rare earth nitrates is extracted with an organic phase containing an extractant which comprises at least one organophosphinic compound having the Formula I or I':

(I)

(I')

wherein $R_1$ and $R_2$, which may be identical or different, and either substituted or unsubstituted, are each alkyl, cycloalkyl, alkoxyalkyl or alkylcycloalkyl radicals, and X is either hydrogen or a salt moiety.

When $R_1$ and/or $R_2$ are substituted, representative substituents include, for example, hydroxyl groups or halogen atoms, in particular chlorine and fluorine, and when X is a salt moiety, representative cations include alkali metals, preferably sodium, or alkaline earth metals, or an ammonium radical.

$R_1$ and $R_2$ are preferably linear or branched chain alkyl radicals having at least 6 carbon atoms, or cycloalkyl radicals having at least 6 carbon atoms; X is preferably a hydrogen atom.

BRIEF DESCRIPTION OF THE DRAWINGS

FIG. 1 is a schematic/diagrammatic representation of one embodiment of the liquid/liquid extraction process/apparatus according to the invention;

FIG. 2 is a schematic/diagrammatic representation of another embodiment of the process/apparatus according to the invention; and FIG. 3 is also a schematic/diagrammatic representation of still another embodiment of the process/apparatus of this invention.

DETAILED DESCRIPTION OF THE INVENTION

More particularly according to the present invention, exemplary of the subject organophosphinic acids having the Formula I or Formula I', representative are:

(1) Dimethylphosphinic acid;
(2) Di-n-propylphosphinic acid;
(3) Diisopropylphosphinic acid;
(4) Di-n-butylphosphinic acid;
(5) Di-isobutylphosphinic acid;
(6) Di-n-pentylphosphinic acid;
(7) Di-n-hexylphosphinic acid;
(8) Di-n-heptylphosphinic acid;
(9) Di-n-octylphosphinic acid;
(10) Bis(2-ethylhexyl)phosphinic acid;
(11) Di-n-nonylphosphinic acid;
(12) Di-n-decylphosphinic acid;
(13) Di-n-dodecylphosphinic acid;
(14) Di-n-tetradecylphosphinic acid;
(15) Di-n-hexadecylphosphinic acid;
(16) Di-n-eicosylphosphinic acid;
(17) Bis(2,4,4-trimethylpentyl)phosphinic acid;
(18) (2,4,4-Trimethylpentyl)cyclohexylphosphinic acid;
(19) (2,4,4-Trimethylpentyl)octylphosphinic acid;
(20) Dicyclopentylphosphinic acid;
(21) Dicyclohexylphosphinic acid;
(22) Dicyclooctylphosphinic acid;
(23) Cyclohexyl-n-butylphosphinic acid;
(24) Cyclopentyl-n-dodecylphosphinic acid;
(25) Cyclooctylethylphosphinic acid;
(26) 2,4,6-Triisopropyl-1,3,5-dioxaphosphorinane-5-hydroxy-5-oxide phosphinic acid;
(27) Cyclohexylphenylphosphinic acid;
(28) Cyclo-p-tolylphosphinic acid;
(29) Cyclohexyl-1-hydroxycyclohexylphosphinic acid;
(30) Bis(2-methyl-1-hydroxypentyl)phosphinic acid;
(31) Cyclopentyl-1-hydroxycyclopentylphosphinic acid;
(32) 1-Methylpentyl-1-hydroxy-1-methylpentylphosphinic acid;
(33) (1-Hydroxy-1-methylethyl)isopropylphosphinic acid.

The various phosphinic acids may be used either alone or in any admixture thereof.

The phosphinic acids which are preferably used in the process of the invention are:
(i) Di-n-octylphosphinic acid;
(ii) Bis(2-ethylhexyl)phosphinic acid;
(iii) Bis(2,4,4-trimethylpentyl)phosphinic acid;
(iv) 2,4,4-Trimethylpentylcyclohexylphosphinic acid;
(v) Dicyclohexylphosphinic acid.

The compounds of Formula I or I' may be used in pure form or else in the form of a commercial product, in which case they may contain small amounts of various impurities, particularly the phosphine oxides.

The aqueous phase which is contacted with the extraction agent, and extracted therewith, may consist of an aqueous solution emanating from redissolving, with nitric acid, the hydroxides obtained as a result of the sodium attack of ores containing the rare earths, such as monazite, bastnaesite and xenotime. Any other aqueous solution of rare earth salt may also be used, after anion-exchange to the nitrate anion.

The process of the invention is applicable to solutions as such, or to solutions after they have been concentrated.

Typically, the liquid/liquid extraction according to the invention is carried out using aqueous solutions of rare earth nitrates having a concentration, expressed as the oxides of the rare earths, ranging from 20 g/l to 500 g/l; these limits are not critical. Preferably, such solutions have a concentration in rare earths ranging from 100 g/l to 500 g/l.

These solutions are typically of an acidity ranging from 0.01N to 3.0N.

The organic phase utilized in the subject process optionally contains, in addition to the extractant, an organic diluent which does not alter the complexing properties of the organophosphinic compound. Suitable such diluents are those customarily used to carry out liquid/liquid extractions. Exemplary of same, representative are the aliphatic hydrocarbons such as, for example, hexane, heptane, dodecane and petroleum cuts of the kerosene type; aromatic hydrocarbons such as, for example, benzene, toluene, ethylbenzene, xylene and cuts of the Solvesso type (registered trademark of the EXXON Company) and, finally, the halogen derivatives such as, for example, chloroform and carbon tetrachloride.

A mixture of these diluents can also be used.

The extraction power of the organic solution with respect to the rare earths increases when the concentration of the organophosphinic compound in the organic phase is increased; however, the separation factors of the elements from each other are not modified substantially by the concentration of the organophosphinic compound. Thus, the concentration of organophosphinic compound in the organic phase is not critical according to the invention and may vary over wide limits. For example, it may vary from 5% of the volume of the organic phase, when the extractant is in solution in a diluent, up to about 100% when the extractant is used pure.

The organic phase may also contain various modifying agents, or modifiers, one of the essential purposes of which is to improve the hydrodynamic properties of the system without altering the complexing properties of the organophosphinic compound. Exemplary compounds well suited for such purpose, representative are compounds having an alcohol function and, in particular, heavy alcohols, the number of carbon atoms of which ranging from 4 to 15, and heavy phenols, as well as other compounds such as certain phosphoric esters, e.g., tributylphosphate, the phosphine oxides, or the sulfoxides. An amount ranging from 3 to 20% by volume with respect to the organic phase is generally advantageous.

In the selection of the extraction conditions, the concentration of hydrogen ions $H+$ in the aqueous phase is important since it can facilitate the extraction of the rare earth or earths to be extracted in the organic phase.

When the concentration of $H+$ ions is low in the aqueous phase, the rare earths distribute themselves more in the organic phase, while when $H+$ ion concentration is high in the aqueous phase, the rare earths distribute themselves better in the aqueous phase.

It is therefore desirable that the extraction be carried out with a low $H+$ ion concentration in the aqueous phase, the extraction pH preferably being greater than or equal to 3. For this purpose, the $H+$ ion concentration of the aqueous phase may be adjusted by adding an alkaline base, which may be, for example, caustic soda or ammonia. A dilute or concentrated aqueous solution of ammonia is preferably employed; its concentration may vary over wide limits, for example, from 1 to 10N, but the use of a concentrated solution of ammonia is preferable.

The amount of alkaline base added should preferably stoichiometrically correspond to the amount of the rare earth or earths desired to be extracted into the organic phase.

During extraction, the organic phase and the aqueous phase are contacted at a temperature which is not critical; it advantageously ranges from 10° C. to 50° C. and preferably from 20° C. to 40° C.

The ratio of the rate of flow of the organic phase to that of the aqueous phase is correlated with the concentration of the extraction agent and is selected in accordance with the concentration of the rare earths to be extracted in the aqueous phase, and also in accordance with the particular apparatus used for carrying out the process of the invention. It is calculated in accordance with determinations well known to this art.

When certain rare earths have been extracted into the organic phase in small amounts, when it is desired that they should have been retained in the aqueous phase, it is at times necessary to employ a washing step after the extraction step to rid the organic phase thereof.

In the washing step, the organic phase is washed with an aqueous solution containing nitrate ions, such as an aqueous solution of nitric acid, or an aqueous solution of the nitrates of the same rare earths as those sought to be extracted (and which may comprise the fraction of the aqueous phase obtained in the following operation of regeneration of the solvent of extraction).

When the washing is carried out with a solution of nitric acid, its concentration is not critical and may range from 0.1N to 10N, and preferably from 0.3N to 5N. When using an aqueous solution of rare earth nitrates, its concentration, expressed as the rare earth oxides, advantageously ranges from 5 to 500 g/l, and preferably from 25 to 300 g/l.

After extraction and washing, followed by separation of the aqueous phase from the organic phase, an extraction solvent regeneration step is next carried out.

The rare earth or earths extracted into the organic phase are separated by contacting said phase with an aqueous acid solution such as, for example, an aqueous solution of nitric acid, sulfuric acid, hydrochloric acid, or perchloric acid. Nitric acid is the preferred.

The concentration of the acid solution is also not critical and may vary from 0.5N to 10N, and preferably from 1N to 5N.

The rare earth or earths extracted are transferred into the aqueous phase, whereas the extraction solvent can be recycled to the extraction step. This recycling is not essential according to the present invention, but is desirable for reasons of economy.

A scheme is set forth below which makes it possible to separate at least two rare earths and up to n rare earths in accordance with the process of the invention.

In the case of the separation of two rare earths symbolized by $TR_1$ and $TR_2$, the separation factor between these rare earths is defined as the ratio between the partition coefficients of $TR_1$ and $TR_2$:

$$F = \frac{P\,TR_1}{P\,TR_2}$$

The partition coefficient is equal to the ratio between the concentration of $TR_1$ (or $TR_2$) in the organic phase and the concentration of $TR_1$ (or $TR_2$) in the aqueous phase.

In order to effect a separation between $TR_1$ and $TR_2$, F must be other than 1.

If $TR_1$ is the rare earth which has the highest partition coefficient, then in this case F is greater than 1.

According to the invention, the separation of at least two rare earths $TR_1$, $TR_2$ is effected by liquid/liquid extraction of an aqueous phase containing at least the nitrates of these values with an organic phase containing an organophosphinic compound, and in the following manner:

(i) In a first step, the $TR_1$ and $TR_2$ are separated by extraction of the $TR_1$ into the organic phase, with the $TR_2$ remaining essentially completely in the aqueous phase;

(ii) In a second step, the selective washing of the organic phase containing the $TR_1$ and trace amounts of $TR_2$ is carried out using an aqueous solution containing nitrate ions, thus eliminating the $TR_2$ from the organic phase by transfer into the aqueous phase;

(iii) The organic phase is then separated from the aqueous phase; and (iv) In a third step, the extraction solvent is regenerated by contacting the organic phase with an aqueous acid solution.

Representative operating conditions for each step have been set forth above.

According to the invention, a mixture of n rare earths can be separated into two sub-groups by likening each sub-group to $TR_1$ and $TR_2$.

Beginning with a mixture of n rare earths which are to be individually separated, then the succession of the three steps described immediately above will be repeated $(n-1)$ times in order to separate all of the rare earths from each other.

In practice, the process of the invention is conveniently carried out using conventional countercurrent technique as explained above, and also by cocurrent or crossed-flow technique, which too are well known to this art.

The various contacting and washing steps can be carried out, in particular, in conventional countercurrent liquid/liquid extraction apparatus. Such apparatus typically comprises multistage mixer-settler systems, or packed and/or agitated columns, adapted for extraction, selective washing, recovery of the rare earth elements in aqueous phase and regeneration of the extraction agent.

In order to further illustrate the present invention and the advantages thereof, the following specific examples are given (and wherein all parts and percentages are given by weight), it being understood that same are intended only as illustrative and in nowise limitative.

EXAMPLE 1

Separation of Ytterbium from Aqueous Admixture Containing Ytterbium and Lutecium Nitrates The procedure and technique used in this Example were as shown in FIG. 1 of the accompanying drawings.

The apparatus used for the separation of said rare earths comprised:

(i) A first multistage, countercurrent liquid/liquid extraction battery of the mixer-settler type, and including an extraction stage a having 16 theoretical stages and a wash stage a' having 10 theoretical stages; and (ii) A stage b for the regeneration-recovery of the extraction solvent, and having 4 theoretical stages.

The initial mixture of rare earths to be separated was a solution of rare earth nitrates having an acidity of 0.1N and a concentration, expressed as the rare earth oxides, of 38.7 g/l, distributed in the following manner:

(1) Ytterbium oxide: 87.5%
(2) Lutecium oxide: 12.5%

The extractant used was bis(2,4,4-trimethylpentyl)-phosphinic acid. It was used as marketed under the trademark CYANEX 272 and contained 10% tri-(2,4,4-trimethylpentyl)phosphine oxide.

The extractant was dissolved in kerosene in an amount of 1 mole/liter and the mixture obtained is hereafter referred to as the extraction solvent.

Prior to complete description of the various processing steps, it should be appreciated that the direction of flow of the organic phase was predetermined as regards its inlet/outlet into and from each of the extraction, wash and regeneration-recovery stages.

The following steps were successively carried out:

(i) The solution of rare earth nitrates to be separated was introduced via the conduit 1 into the outlet end of the extraction unit a at a rate of flow of 45 l/h; into the inlet end of said extraction unit a there were introduced, on the one hand, extraction solvent at a rate of 50 l/h through the conduit 2 and, on the other hand, a 10N aqueous ammonia solution at a rate of flow of 6.25 l/h through the conduit 3;

(ii) A 0.45N aqueous solution of nitric acid was introduced at a rate of flow of 132 l/h into the wash stage a' via the conduit 4;

(iii) At the inlet end of the extraction zone a, there was recovered, via the conduit 5, an aqueous solution of rare earth nitrates having a concentration, expressed as the rare earth oxides, of 8 g/l and having the composition: 99.3% $Yb_2O_3$ and 0.7% $Lu_2O_3$;

(iv) The organic phase exiting the wash stage a' was countercurrently introduced into the inlet end of the regeneration-recovery stage b, at the same rate of flow of 50 l/h, said countercurrent direction being with respect to a 1N solution of nitric acid introduced therein via conduit 6 at a rate of flow of 3 l/h;

(v) At the inlet end of the regeneration-recovery stage b, there was recovered, via the conduit 7, an aqueous solution of rare earth nitrates having a concentration, expressed as the rare earth oxides, of 98 g/l and having the composition: 74% $Lu_2O_3$ and 26% $Yb_2O_3$; and (vi) At the outlet end of the regeneration-recovery stage b, there was recovered, via the conduit 8, the purified extraction solvent, which was recycled via line 2 into the inlet end of the extraction stage a at the same rate of flow; however, this recycling is not essential to the present invention, although it is desirable for reasons of economy.

The process described permitted the recovery of ytterbium values from a mixture of rare earths in excellent extraction yield, namely, 95%, and in very high purity, namely, 99.3%.

EXAMPLE 2

Separation of Thulium (Tm) From Aqueous Admixture Containing the Nitrates of Thulium (Tm), Ytterbium (Yb), Lutecium (Lu) and Yttrium (Y)

The procedure and technique used in this Example were as shown in FIG. 2 of the accompanying drawings.

The apparatus used for the separation of said rare earths comprised:

(i) A first multistage, countercurrent liquid/liquid extraction battery of the mixer-settler type, and consisting of an extraction stage a having 19 theoretical stages and a wash stage a' having 16 theoretical stages;

(ii) A first regeneration-recovery stage b for the extraction solvent having 10 theoretical stages;

(iii) An evaporator to concentrate the aqueous solution exiting the extraction stage a;

(iv) A second countercurrent liquid/liquid extraction battery consisting of an extraction stage c having 8 theoretical stages and a wash stage c' having 10 theoretical stages; and (v) A second regeneration-recovery stage d for the extraction solvent having 8 theoretical stages.

The initial mixture of rare earths to be separated was a solution of rare earth nitrates having an acidity of 1.0N and a concentration, expressed as the rare earth oxides, of 132 g/l, distributed in the following manner:

(1) Thulium oxide: 12%
(2) Ytterbium oxide: 77%
(3) Lutecium oxide: 10.9%
(4) Yttrium oxide: 0.1%

The extractant used was bis(2,4,4-trimethylpentyl-phosphinic acid. It was employed as marketed under the trademark CYANEX 272 and contained 10% tri-(2,4,4-trimethylpentyl)phosphine oxide.

The extractant was dissolved in kerosene in an amount of 1 mole/liter and the mixture obtained is hereafter referred to as the extraction solvent.

The direction of flow of the organic phase had been predetermined as in Example 1.

Thus, in a first series of steps:

(i) At the outlet end of the extraction stage a, via the conduit 1, there was introduced the solution of the nitrates of the rare earths to be separated, at a rate of flow of 15 l/h; at the inlet end of the extraction stage a, on the one hand, the extraction solvent was countercurrently introduced via the conduit 2 at a rate of flow of 380 l/h, and, on the other hand, a 10N aqueous ammonia solution was introduced at a rate of flow of 9.2 l/h via the conduit 3;

(ii) A 2N aqueous solution of nitric acid was introduced at a rate of flow of 3 l/h into the wash stage a' via the conduit 4;

(iii) At the inlet end of the extraction stage a, there was recovered, via the conduit 5, an aqueous solution of rare earth nitrates having a concentration, expressed as the rare earth oxides, of 8.7 g/l and having the composition: 99% $Tm_2O_3$, 1% $Y_2O_3$ and less than 200 ppm of $Yb_2O_3 + Lu_2O_3$;

(iv) The organic phase exiting the wash stage a' was countercurrently introduced into the inlet end of the regeneration-recovery stage b, again at the same rate of flow of 380 l/h, said countercurrent flow being with respect to a 1N nitric acid solution introduced therein via conduit 6 at a rate of flow of 45 l/h;

(v) At the inlet end of the regeneration-recovery stage b, there was recovered, via the conduit 7, an aqueous solution of rare earth nitrates having a concentration, expressed as the rare earth oxides, of 38.7 g/l, and having the composition: 87.5% $Yb_2O_3$, 12.5% $Lu_2O_3$ and less than 1000 ppm of $Tm_2O_3 + Y_2O_3$; and (vi) At the outlet end of the regeneration-recovery stage b, the purified extraction solvent was recovered, via the conduit 8, and recycled via line 2 back into the extraction stage a at the same rate of flow.

In an intermediate step, the concentration of the aqueous solution of rare earth nitrates exiting the conduit 5 at the inlet end of the extraction stage a, which contained essentially only the thulium and yttrium nitrates, was carried out by evaporation of said solution until a concentration was obtained, expressed as the rare earth oxides, of 23.7 g/l.

Then, in a second series of steps:

(i) At the outlet end of the extraction stage c, the solution of thulium and yttrium nitrates which had been concentrated was introduced, via the conduit 9, at a rate of flow of 10 l/h; at the inlet end of the extraction stage c, there was introduced, on the one hand, via the conduit 10, the same extraction solvent as above, at a rate of flow of 110 l/h and, on the other hand, via the conduit 11, a 10N aqueous ammonia solution at a rate of flow of 2.5 l/h;

(ii) A 1.25N aqueous solution of nitric acid was introduced at a rate of flow of 10 l/h into the wash stage c' via the conduit 12;

(iii) An aqueous solution containing trace amounts of yttrium nitrate and thulium nitrate was recovered at the inlet end of the extraction stage c via the conduit 13;

(iv) The organic phase exiting the wash stage c' was countercurrently introduced into the regeneration-recovery stage d, again at the same rate of flow of 110 l/h, said countercurrent flow being with respect to a 1.25N nitric acid solution introduced via the conduit 14 at a rate of flow of 13 l/h;

(v) At the inlet end of the regeneration-recovery stage d, there was recovered, via the conduit 15, an aqueous thulium nitrate solution having a concentration, expressed in $Tm_2O_3$, of 61.5 g/l and containing less than 20 ppm of $Y_2O_3$ and less than 200 ppm of $Yb_2O_3 + Lu_2O_3$;

(vi) At the outlet end of the regeneration-recovery stage d, there was recovered, via the conduit 16, the purified extraction solvent which was recycled via line 10 back into the extraction stage c at the same rate of flow.

The process described permitted the recovery of thulium values from a mixture of rare earths with an extraction yield of 99.9% and a purity of 99.9%.

EXAMPLE 3

Separation of Terbium (Tb) and Dysprosium (Dy) from Aqueous Admixture Containing Nitrates of Terbium (Tb), Dysprosium (Dy), Samarium (Sm), Europium (Eu) and Gadolinium (Gd)

The procedure and technique of this Example were as shown in FIG. 3 of the accompanying drawings.

The apparatus used for the separation of said rare earths comprised:

(i) A first multistage countercurrent liquid/liquid extraction battery of the mixer-settler type, and consisting of an extraction stage a having 10 theoretical stages and a wash stage a' having 4 theoretical stages;

(ii) A first regeneration-recovery stage b for the extraction solvent having 5 theoretical stages;

(iii) A second countercurrent liquid/liquid extraction battery consisting of an extraction stage c having 13 theoretical stages and a wash stage c' having 5 theoretical stages; and (iv) A second regeneration-recovery stage d for the extraction solvent having 4 theoretical stages.

The initial mixture of rare earths to be separated was a solution of rare earth nitrates having an acidity of 0.01N and a concentration, expressed as the rare earth oxides, of 157.3 g/l, distributed as follows:

(1) Terbium oxide: 3%
(2) Dysprosium oxide: 10.5%
(3) Samarium oxide: 49%
(4) Europium oxide: 1.5%
(5) Gadolinium oxide: 36%

The extractant used was bis(2,4,4-trimethylpentyl)-phosphinic acid. It was used as marketed under the trademark CYANEX 272 and contained 10% tri(2,4,4-trimethylpentyl)phosphine oxide.

The extractant was dissolved in kerosene in an amount of 1 mole/liter and the mixture obtained is hereafter referred to as the extraction solvent.

In a first series of steps:

(i) The solution of rare earth nitrates to be separated was introduced, at a rate of flow of 200 l/h, into the outlet end of the extraction stage a via the conduit 1; at the inlet end of said extraction stage a, on the one hand, the extraction solvent was introduced via the conduit 2 at a rate of flow of 1150 l/h and, on the other hand, a 10N aqueous ammonia solution was introduced via the conduit 3 at a rate of flow of 78 l/h;

(ii) A 4N aqueous nitric acid solution was introduced, at a rate of flow of 66 l/h, into the wash stage a' via the conduit 4;

(iii) At the inlet end of the extraction stage a, there was recovered, via the conduit 5, an aqueous solution of rare earth nitrates having a concentration, expressed as the rare earth oxides, of 79.1 g/l and the following composition: 56.7% $Sm_2O_3$, 41.6% $Gd_2O_3$, 1.7% $Eu_2O_3$ and less than 0.2% $Tb_4O_7 + Dy_2O_3$ expressed with respect to the weight of the mixture of the samarium, gadolinium and europium oxides;

(iv) The organic phase exiting the wash stage a' was countercurrently introduced into the regeneration-recovery stage b, again at the same rate of flow of 1150 l/h, said countercurrent flow being with respect to a 4N solution of nitric acid introduced through the conduit 6 at a rate of flow of 20 l/h;

(v) At the inlet end of the regeneration-recovery stage b there was recovered, via the conduit 7, an aqueous solution of rare earth nitrates having a concentration, expressed as the rare earth oxides, of 212.3 g/l, the composition of which was as follows: 22% $Tb_4O_7$ and 78% $Dy_2O_3$;

(vi) At the outlet end of the regeneration-recovery stage b the purified extraction solvent was recovered via the conduit 8, and recycled via line 2 back into the extraction stage a at the same rate of flow.

In a second series of steps:

(i) The solution of terbium and dysprosium nitrates recovered via the conduit 7 at the inlet end of the regeneration-recovery stage b of the preceding step was transferred to the outlet end of the extraction stage c, via the conduit 9, at a rate of flow of 20 l/h; at the inlet end of the extraction stage c there was introduced, on the one hand, via the conduit 10, the same extraction solvent as above, at a rate of flow of 655 l/h and, on the other hand, via the conduit 11, a 10N aqueous ammonia solution at a rate of flow of 16.8 l/h;

(ii) A 4N aqueous solution of nitric acid was introduced, at a rate of flow of 26.5 l/h, into the wash stage c via the conduit 12;

(iii) At the inlet end of the extraction stage c, there was recovered, via the conduit 13, a 99.9% aqueous terbium nitrate solution having a $Tb_4O_7$ concentration of 14.8 g/l;

(iv) The organic phase exiting the wash stage c' was countercurrently introduced into the regeneration-recovery stage d, again at the same rate of flow of 655 l/h, said countercurrent flow being with respect to a 4N nitric acid solution introduced via the conduit 14 at a rate of flow of 15.6 l/h;

(v) At the inlet end of the regeneration-recovery stage d, there was recovered, via the conduit 15, an aqueous dysprosium nitrate solution having a concentration expressed in $Dy_2O_3$ of 212.3 g/l and containing less than 1% $Tb_4O_7$; and (vi) At the outlet end of the regeneration-recovery stage b, the purified extraction solvent was recovered, via the conduit 16, and recycled via line 10 back into the extraction stage c at the same rate of flow.

The process of the present invention thus permitted the separation of terbium from a mixture of rare earths with an extraction yield of 95% and a purity of 99.9% and dysprosium with an extraction yield of 98% and a purity of 99%.

EXAMPLE 4

In order to illustrate the selectivity of the method of the invention for the separation of at least one element selected from among the lanthanides and yttrium, the procedure of Example 1 was repeated, again using bis(2,4,4-trimethylpentyl)phosphinic acid (CYANEX 272).

An aqueous nitric phase having a concentration equal to 100 g of rare earth oxides per liter of aqueous phase was extracted with an organic phase consisting of the bis(2,4,4-trimethylpentyl)phosphinic acid in solution in kerosene, at the rate of 1 mole/liter; the ratio of the volumes of the respective phases was equal to 1.

The extraction was carried out at room temperature.

The following separation factors were determined for the following pairs, as reported in the following Table:

TABLE

| $TR_1$ | Nd | Sm | Eu | Gd | Tb | Dy | Ho | Y | Er | Tm | Yb |
|---|---|---|---|---|---|---|---|---|---|---|---|
| $TR_2$ | Sm | Eu | Gd | Tb | Dy | Ho | Y | Er | Tm | Yb | Lu |
| $F = PTR_2/PTR_1$ | 14.9 | 2.21 | 1.28 | 4.78 | 2.38 | 1.68 | 1.44 | 1.53 | 2.79 | 2.87 | 1.47 |
| Concentration of the organic phase, expressed as the rare earth oxides (in g/l) | | 8.15 | | | 10.8 | | | 11.7 | | 15.7 | |

The values of the separation factors given in the above examples made it possible to calculate the conditions to be used to separate two or more elements from among the rare earths and yttrium in accordance with conventional liquid/liquid extraction techniques.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for separating at least one rare earth value from at least one other rare earth value, said values being contained in an aqueous solution comprising at least two rare earths, which process comprises liquid/liquid extracting an aqueous phase comprising at least two rare earth nitrates with an organic phase comprising an organic extractant, said organic extractant comprising at least one organophosphinic compound having one of the formulae (I) or (I'):

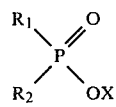

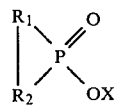

wherein $R_1$ and $R_2$, which may be identical or different, are each substituted or unsubstituted alkyl, cycloalkyl, alkoxyalkyl, or alkylcycloalkyl radicals, and X is either hydrogen or a cation.

2. The process as defined by claim 1, wherein said compounds of the formulae (I) or (I'), $R_1$ and $R_2$ are each a linear or branched chain alkyl or cycloalkyl radical having at least 6 carbon atoms and X is hydrogen.

3. The process as defined by claim 1, said organic extractant comprising di-n-octylphosphinic acid, bis(2-ethylhexyl)phosphinic acid, bis(2,4,4-trimethylpentyl)phosphinic acid, 2,4,4-trimethylpentylcyclohexylphosphinic acid, or dicyclohexylphosphinic acid.

4. The process as defined by claim 1, said aqueous phase comprising at least two rare earth nitrates having a concentration thereof, expressed as the rare earth oxides, ranging from 20 g/l to 500 g/l.

5. The process as defined by claim 4, the acidity of said aqueous phase ranging from 0.01N to 3.0N.

6. The process as defined by claim 1, said organic phase further comprising at least one aliphatic hydrocarbon, petroleum cut of kerosene or Solvesso type, aromatic hydrocarbon or halogenated hydrocarbon organic diluent.

7. The process as defined by claim 1, wherein the concentration of the organophosphinic compound in the organic phase ranges from 5 to 100% of the total volume thereof.

8. The process as defined by claim 1, said organic phase further comprising at least one alcohol, phosphoric ester, phosphine oxide or sulfoxide modifying agent.

9. The process as defined by claim 8, wherein the concentration of the modifying agent in said organic phase ranges from 3 to 20% of the total volume thereof.

10. The process as defined by claim 1, wherein the H+ ion concentration of the aqueous phase during extraction is such that the extraction pH is greater than or equal to 3.

11. The process as defined by claim 10, said H+ ion concentration having been adjusted by addition of a base to said aqueous phase.

12. The process as defined by claim 11, said base comprising caustic soda or ammonia.

13. The process as defined by claim 1, the temperature of extraction ranging from 10° C. to 50° C.

14. The process as defined by claim 1, further comprising washing said organic phase, after extraction, with an aqueous solution containing nitrate ions.

15. The process as defined by claim 14, said wash solution comprising an aqueous nitric acid solution having a concentration ranging from 0.1N to 10N.

16. The process as defined by claim 15, said concentration of aqueous nitric acid solution ranging from 0.3N to 5N.

17. The process as defined by claim 14, said wash solution comprising an aqueous solution of rare earth nitrates, the concentration of which, expressed as the rare earth oxides, ranging from 5 to 500 g/l.

18. The process as defined by claim 17, said concentration of the aqueous solution of rare earth nitrates ranging from 25 to 300 g/l.

19. The process as defined by claim 14, further comprising separating said washed organic phase into an aqueous phase and an organic phase, and regenerating said organic extractant by back-extracting said organic phase with an aqueous acid solution.

20. The process as defined by claim 19, said aqueous acid solution comprising an aqueous solution of nitric acid, sulfuric acid, hydrochloric acid or perchloric acid.

21. The process as defined by claim 20, said aqueous acid solution comprising a nitric acid solution.

22. The process as defined by claim 20, the concentration of said aqueous acid solution ranging from 0.5N to 10N.

23. The process as defined by claim 22, the concentration of said aqueous acid solution ranging from 1 to 5N.

24. A process for separating a first rare earth value $TR_1$ from another rare earth value $TR_2$, said values $TR_1$ and $TR_2$ comprising an aqueous solution of the nitrates thereof, which process comprises liquid/liquid extracting an aqueous phase comprising said $TR_1$ and $TR_2$ nitrates with the organic phase as defined in claim 1, whereby said values $TR_1$ are transferred into the organic phase and essentially all of said $TR_2$ values remain in said aqueous phase, washing said organic phase with an aqueous solution to eliminate residual $TR_2$ values therefrom, separating the organic phase from the aqueous phase, recovering $TR_1$ values from said organic phase and $TR_2$ values from said aqueous phase, and regenerating the organic extractant by extracting the organic phase with an aqueous acid solution.

25. The process as defined by claim 24, wherein either or both of said values $TR_1$ and $TR_2$ comprises a plurality of rare earth elements.

* * * * *